US011311929B2

(12) United States Patent
Larrucea De La Rica et al.

(10) Patent No.: US 11,311,929 B2
(45) Date of Patent: Apr. 26, 2022

(54) DEVICE FOR CALIBRATING AND LIGHTENING THE WEIGHT OF CRANKSHAFTS

(71) Applicant: CIE Automotive, S.A., Bilbao (ES)

(72) Inventors: Francisco Larrucea De La Rica, Bilbao (ES); Virginia Manso Rodríguez, Bilbao (ES)

(73) Assignee: CIE Automotive, S.A., Bibao (ES)

( * ) Notice: Subject to any disclaimer, the term of this patent is extended or adjusted under 35 U.S.C. 154(b) by 164 days.

(21) Appl. No.: 16/303,978

(22) PCT Filed: May 24, 2016

(86) PCT No.: PCT/ES2016/070391
§ 371 (c)(1),
(2) Date: Nov. 21, 2018

(87) PCT Pub. No.: WO2017/203066
PCT Pub. Date: Nov. 30, 2017

(65) Prior Publication Data
US 2020/0038939 A1     Feb. 6, 2020

(51) Int. Cl.
*B21J 5/02*     (2006.01)
*B21J 13/02*     (2006.01)
(Continued)

(52) U.S. Cl.
CPC .............. *B21J 5/02* (2013.01); *B21J 13/02* (2013.01); *B21K 1/08* (2013.01); *F16C 3/08* (2013.01); *F16C 2220/40* (2013.01)

(58) Field of Classification Search
CPC ......... B21K 1/08; B21K 1/02; B23P 2700/07; B23P 9/04; B21J 5/02; B21J 5/12;
(Continued)

(56) References Cited

U.S. PATENT DOCUMENTS 1,932,584 A * 10/1933 Hansen .............. B21D 51/2669
72/392
8,371,029 B2 * 2/2013 Ito .............................. B21J 5/06
29/888.08
(Continued)

FOREIGN PATENT DOCUMENTS

DE     2754443 A1 * 6/1979 ............. B21K 21/06
JP     58199637 A * 11/1983 ............. B21J 13/00
WO     WO2016009620    1/2016

OTHER PUBLICATIONS

Engineeringclicks, Break sharp edges, Feb. 7, 2014, engineeringclicks, https://www.engineeringclicks.com/forum/threads/break-sharp-edges.3773/ (Year: 2014).*
(Continued)

*Primary Examiner* — Debra M Sullivan
(74) *Attorney, Agent, or Firm* — Gardner, Linn, Burkhart & Ondersma LLP

(57) ABSTRACT

A device for lightening the weight of vehicle components includes a tooling provided with a seat wherein the component is formed and a plurality of moveable bodies, which are moveable between an initial position and a final position, such that in the final position one end of each moveable body penetrates the seat of the tooling to form a cavity to lighten the weight of a component of the vehicle, wherein at least one of the moveable bodies can move laterally. Such device allows lightening the weight in a more simple and productive way than in currently known systems. This is achieved because the moveable bodies do not interfere with each other during the movement thereof, such that the lightening process can be done in a single blow during a forging procedure.

18 Claims, 3 Drawing Sheets

(51) Int. Cl.
*B21K 1/08* (2006.01)
*F16C 3/08* (2006.01)

(58) Field of Classification Search
CPC ... B21J 9/02; B21J 9/027; B21J 13/025; B21J 13/00; B21J 13/02; B21J 13/04; B21J 13/06; B21J 15/02; B21J 15/12; B21D 53/845; B21D 3/14; B21D 3/16; B21D 1/065; F16C 3/06
USPC .............. 29/888.08; 72/381, 394, 403, 476
See application file for complete search history.

(56) References Cited

U.S. PATENT DOCUMENTS

| | | | |
|---|---|---|---|
| 8,468,696 B2* | 6/2013 | Ohnuma | F16C 3/14 29/888.08 |
| 9,327,337 B2* | 5/2016 | Barthlein | B29C 57/04 |
| 2010/0242241 A1 | 9/2010 | Ito et al. | |
| 2011/0308052 A1 | 12/2011 | Ohnuma et al. | |
| 2013/0008275 A1* | 1/2013 | Watanabe | B21K 23/00 74/424.86 |
| 2014/0318310 A1 | 10/2014 | Ohnuma et al. | |
| 2015/0314365 A1* | 11/2015 | Okubo | B21J 9/027 72/360 |
| 2017/0136521 A1* | 5/2017 | Sakamoto | B21J 13/08 |
| 2018/0147621 A1* | 5/2018 | Yamashita | B21K 1/08 |

OTHER PUBLICATIONS

International Search Report and Written Opinion of corresponding PCT Application No. PCT/ES2016/070391, dated Nov. 8, 2016.

* cited by examiner

DEVICE FOR CALIBRATING AND LIGHTENING THE WEIGHT OF CRANKSHAFTS

FIELD OF THE INVENTION

The present invention relates to a device for calibrating and lightening the weight of crankshafts of a motor of a vehicle.

BACKGROUND OF THE INVENTION

Over the last several decades, automobile manufacturers and automotive component manufacturers have been required to comply with increasingly stricter environmental obligations when developing their products. Social and governmental pressure to improve energy efficiency and emission levels of vehicles is a factor that has had an enormous impact on the sector.

Furthermore, there is enormous pressure within the automotive sector to reduce costs, which implies taking measures at every stage of the value chain of a product.

The key factor to facing this challenge is reducing weight: the smaller the vehicle, the less power required to accelerate it, and less energy required to maintain a constant speed, in addition to lower costs on raw material for the manufacturer.

New internal combustion engines have to have a lot of power, low fuel consumption, a small size, and must be, as much as possible, environmentally friendly. For example, crankshafts highly influence the performance of the motor, since they are the component that is responsible for generating power, and therefore their weight/resistance relationship is essential.

In metal forming processes, forging is considered the most suitable process for manufacturing crankshafts. Stamping at high forging temperatures is generally the process that leads to the best results. This process is able to produce high quality components at a reasonable cost. Forging provides a high degree of resistance in relation to weight, tenacity and fatigue strength, and resistance to impact, which are all important aspects in the design of crankshafts and for the performance thereof.

To define the forging process, it is first necessary to size the billet of material to be forged. To size the billet, it is necessary to define the load factor which corresponds to a coefficient, by which the volume of the piece must be multiplied to prevent material loss on the burr. Once this factor has been determined, a pre-dimensioning of the billet is done.

Furthermore, it is necessary to know how many blows the piece will be forged with. To this end, a rule is used to define if one blow (final form), two blows (preform and final form), three blows (two preforms and final form) or four blows (three preforms and final form) will be used.

A procedure for manufacturing a crankshaft is known from the document US 2014/0318310 A1. This document describes a procedure for lightening the weight of crankshafts during the forging process without producing a degradation in the resistance of the crankshaft.

The case mentioned in this document consists of a crankshaft with a cavity formed in each module of the crankshaft on the side on which the crankpins are located. These cavities are formed by a series of moveable bodies that penetrate the seat of the tooling during a forming process by forging. This is due the fact that this part is usually chamfered and, as such, the access of the moveable bodies that produce the cavities is easier than on a plane that is perpendicular to the rotating shaft of the crankshaft.

Furthermore, the fact that this is one of the areas of the piece with a greater accumulation of material makes it an optimal part to receive cavities, since eliminating material there will have a smaller impact on the rigidity of the piece than in the other areas of the same, in which the rigidity would be degraded to a larger extent.

The procedure described in this document analyzes the problem for a flat-plane crankshaft with 4 cylinders and 8 counterweights. The moveable bodies take advantage of the inclination of the outer areas of the chamfers in which the crankpins are located to penetrate the piece in a practically perpendicular way, which in another area of the crankshaft would be impossible to problems of space in the tooling.

This document proposes a solution in which there are two types of cavities in the crankshaft. The first has a greater contact area and smaller penetration depth in the crankshaft, while the second is the opposite case, the contact surface is smaller with greater depth in the crankshaft.

By means of this solution, the two moveable bodies that penetrate the crankshaft in each crankpin have the same inclination with respect to the median plane of the cross section of the crankpin.

The reason for this difference in geometry between the two cavities is the following: between the two hollows, a very small separation can be seen in relation to the size of the cavities to be made. This is an oil flow passage that forms part of the refrigerating circuit of the motor assembly. The oil passes from the shaft through a hole towards the surface of the crankpin through another hole.

The main problem with making both cavities in the same geometry is that at least one of the two will invade the space occupied by the oil flow passage; something that must not happen.

Two chamfers are joined by the corresponding crankpin thereof before the moveable bodies penetrate the piece to form the cavities. The two chamfers go from being at a distance A (equal to the length of the crankpin) to being at a practically non-existent distance B, which, without considering structural problems, would prevent the correct rotation and functioning of the crankshaft.

In a graphic representation of the level of lateral deformation of the counterweights, one can see how the movement has a linear relationship with respect to the gap between the preform and the tooling of up to 0.5 mm, and a relationship with a slope approximately 4 times greater starting from 0.5 mm, and therefore it is a highly relevant factor.

On the other hand, to carry out a procedure like the one described in this document, it is necessary to follow a specific order in the formation of the cavities, so that the moveable bodies that have to penetrate do not collide with each other during the process.

Therefore, the procedure and the device described in this document have the problem of interference between the moveable bodies if the process is to be carried out with a single blow.

SUMMARY OF THE INVENTION

The method and device of the present invention may be used to lighten the weight of automotive components with a greater productivity than with the procedures and devices currently known, and provides other advantages which are described below.

The device for calibrating and lightening the weight of crankshafts according to the present invention comprises tooling provided with a seat wherein the component is formed and a plurality of moveable bodies, which are moveable between an initial position and a final position, such that in the final position one end of each moveable body penetrates the seat of the tooling to form a cavity to lighten the weight of a crankshaft, and at least one of the moveable bodies can move laterally.

Optionally, at least one, or all of the moveable bodies, comprise a lowered portion close to the end that forms the cavity to lighten the weight, the lowered portion defining a projecting portion at the end, the projecting portion being that which forms the cavity, the bodies moving diagonally with respect to the seat of the tooling.

Moreover, the moveable bodies are optionally mounted on wedges provided with an inclined plane, the bodies moving diagonally with respect to the seat of the tooling.

Moreover, at least two of the moveable bodies are mounted on an intermediate piece, which, in turn, is mounted on one of the wedges.

To allow the diagonal movement, at least some of the moveable bodies comprise an inclined surface complementary to the inclined plane of the wedges.

Optionally, the projecting portion and the lowered portion have rounded edges.

According to two alternative embodiments, the projecting portion can have a substantially semicircular form in a plan view, or the projecting portion can have a substantially rectangular form with the smaller sides thereof curved in a plan view, based on the type of moveable body.

Optionally, one type of moveable bodies, which are mounted on the intermediate piece, comprise bevels, the moveable bodies substantially in contact with each other by means of these bevels, and furthermore, the bevel of each moveable body is arranged on the end provided with the projecting portion.

According to a preferred embodiment, the tooling comprises a lower edge piece in which the moveable bodies are mounted and an upper edge piece, the upper edge piece being moveable with respect to the lower edge piece and the assembly of the lower and upper edge pieces being moveable with respect to a frame of the device.

Moreover, the wedges are optionally mounted in a fixed way to the frame of the device, such that the movement of the assembly of the lower and upper edge pieces causes the movement of the moveable bodies from the initial position to the final position thereof.

To return to the initial position thereof, each moveable body is optionally associated with a spring, which presses the moveable body back to its initial position.

By means of the device according to the present invention, a component for vehicles with a lighter weight is achieved, the calibrating and lightening of the weight being achieved in a more simple and productive way than in currently known systems.

This is achieved with the device according to the present invention because the moveable bodies do not interfere with each other during the movement thereof, such that the calibrating and lightening process can be done in a single blow in a forging process.

These and other objects, advantages and features of the invention will become apparent upon review of the following specification in conjunction with the drawings.

BRIEF DESCRIPTION OF THE DRAWINGS

For the purpose of helping to make the foregoing description more readily understandable, it is accompanied by a set of drawings which, schematically and by way of illustration and not limitation, represent an embodiment.

DESCRIPTION OF THE PREFERRED EMBODIMENTS

Figure 1:
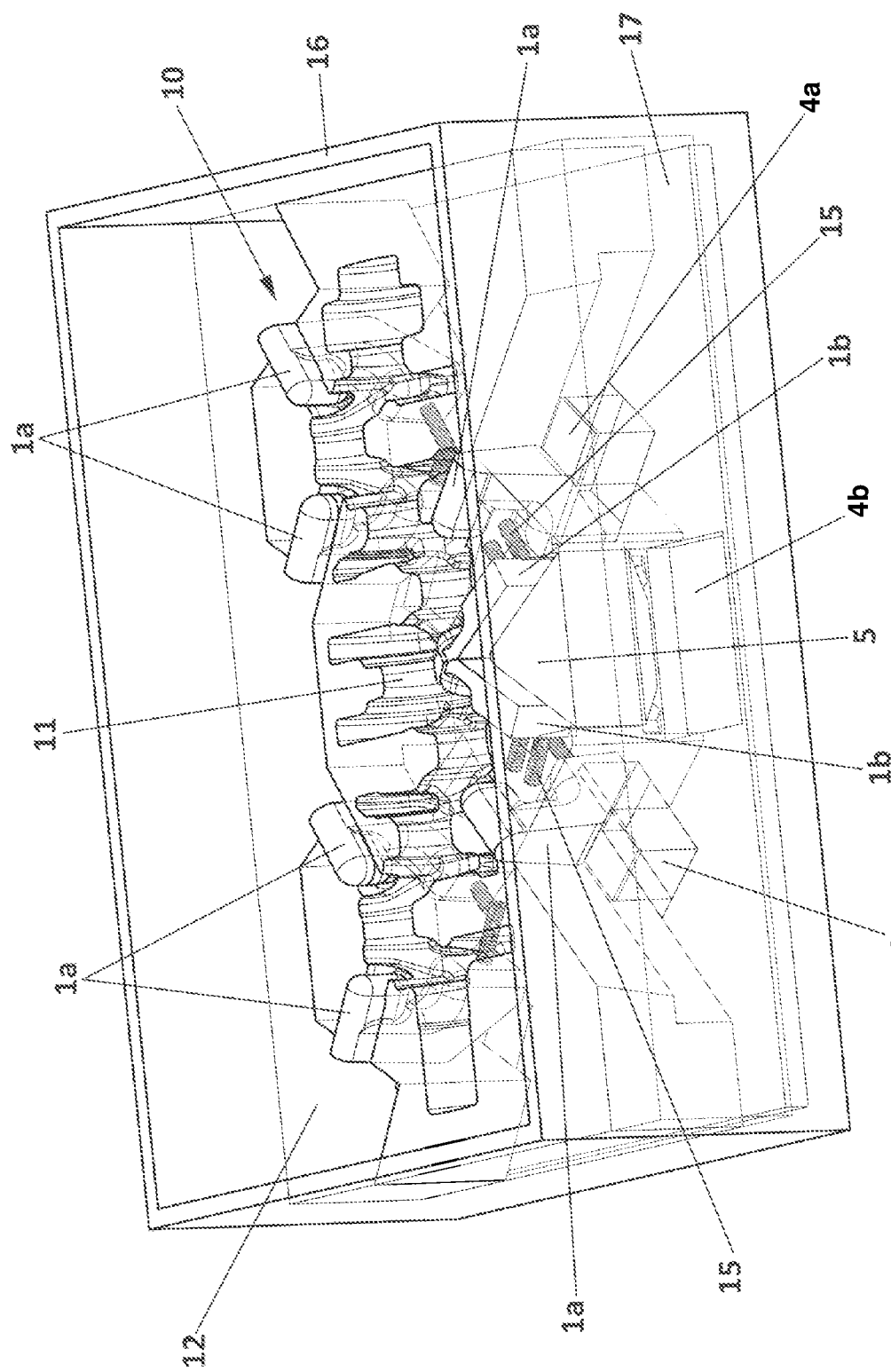
FIG. 1 is a schematic perspective view of the device for calibrating and lightening the weight of crankshafts according to the present invention.

It must first be stated that this preferred embodiment is described in relation to a crankshaft for a vehicle motor.

As was previously mentioned, on a crankshaft it is advantageous to remove material on the contiguous chamfers of each crankpin. This is because they are areas that do not experience significant stresses and do not have any specific function.

The device according to the present embodiment comprises a tooling 10, formed by a lower edge piece 12 and an upper edge piece (not shown in the figures), as will be described further on. The tooling 10 defines a seat 11 in the shape of the component that will be manufactured, such as a crankshaft 14.

For forming the cavities in the component, the device according to the present embodiment comprises a plurality of moveable bodies 1a, 1b, which can move from an initial position (FIG. 4) in which the moveable bodies 1a, 1b are outside of the seat 11, to a final position (FIG. 5), in which one of the two ends of each moveable body 1a, 1b is on the inside of the seat 11 to form the cavities when the component is manufactured 14.

In the case of crankshafts, the component 14 has two types of chamfers. For this reason, it is necessary to design two types of cavities, adapting them to the form of each chamfer and, therefore, the device according to the present embodiment will comprise two types of moveable bodies, respectively identified by the references 1a and 1b, in other words, first moveable bodies 1a and second moveable bodies 1b.

Figure 4:
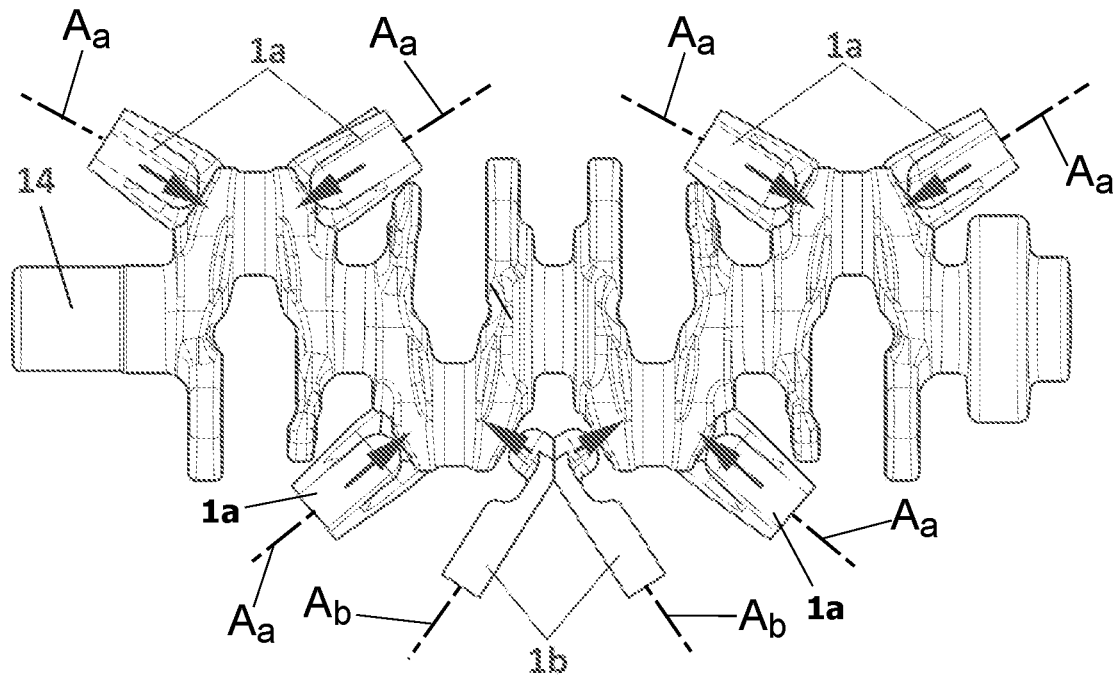
FIG. 4 is a schematic plan view of a crankshaft indicating the initial position of the moveable bodies of the device for calibrating and lightening the weight of crankshafts according to the present invention.
Figure 5:
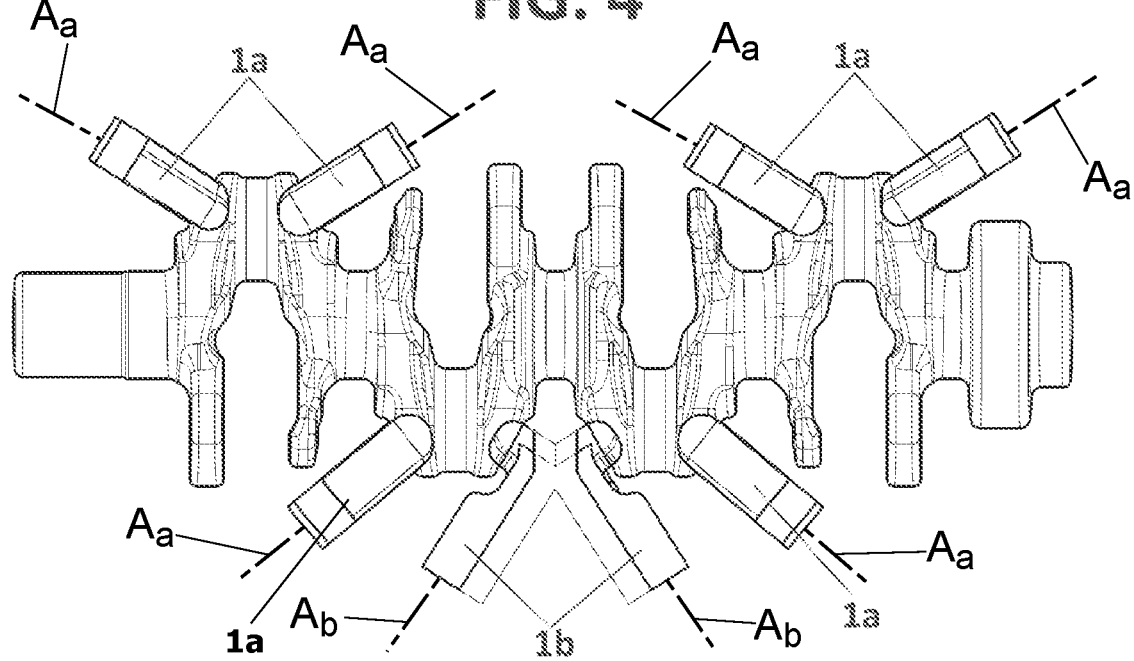
FIG. 5 is a schematic plan view of a crankshaft indicating the final position of the moveable bodies of the device for calibrating and lightening the weight of crankshafts according to the present invention.

The first moveable bodies 1a can move longitudinally along the longitudinal axes $A_a$ thereof and the second moveable bodies 1b can move laterally, in other words, perpendicular with respect to the longitudinal axes $A_b$ thereof, such as shown in FIGS. 4 and 5.

Figure 2:
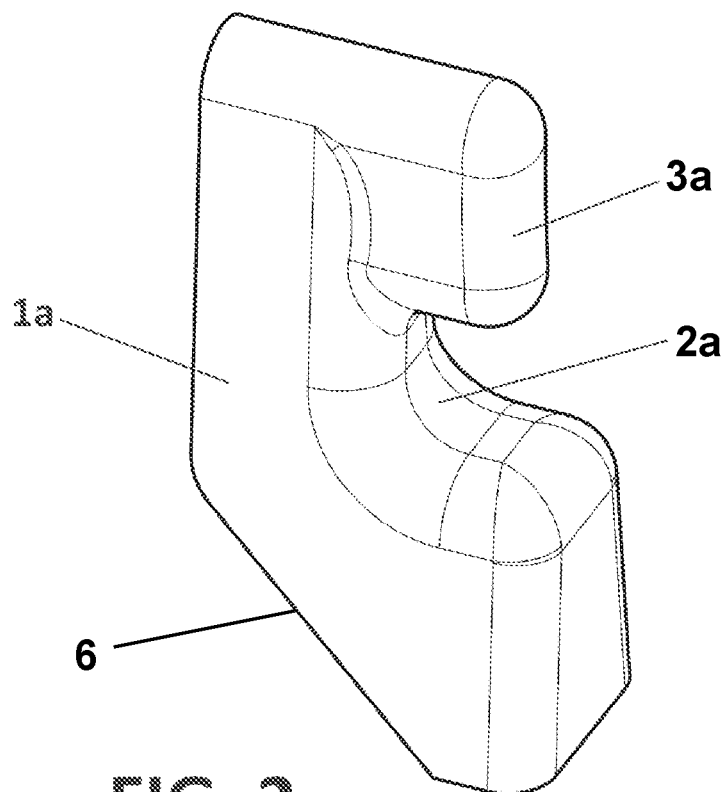
FIGS. 2 and 3 are perspective views of two types of moveable bodies used by the device for calibrating and lightening the weight of crankshafts according to the present invention.
Figure 3:
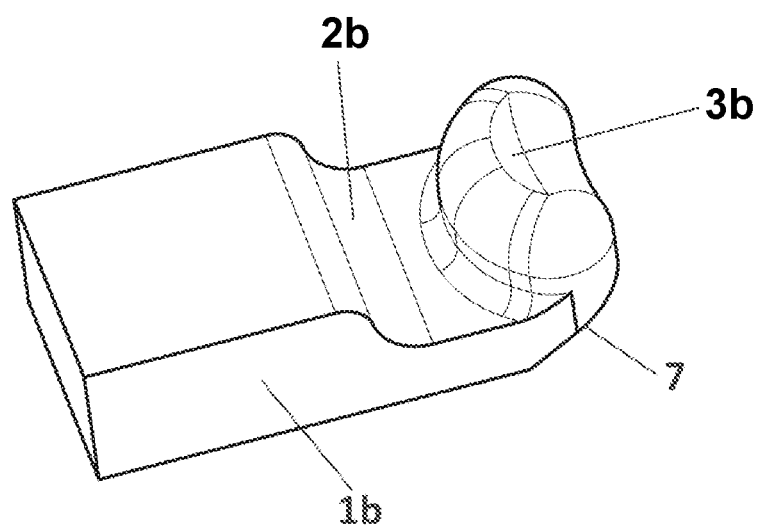

FIGS. 2 and 3 show a first moveable body 1a and a second moveable body 1b, respectively.

In both cases the moveable body 1a, 1b comprises a respective lowered portion 2a, 2b close to one end of the body. This lowered portion 2a, 2b defines a respective projecting portion 3a, 3b, which forms the respective cavity in the component 14.

As can be seen in FIG. 2, in the case of the first moveable body 1a, the first projecting portion 3a has a substantially rectangular plan form with the smaller sides thereof curved, while in the case of the second moveable body 1b, the projecting portion 3a has a substantially semicircular plan form. Moreover, in both cases the edges are rounded to prevent sharp edges.

In the case that the first moveable bodies 1a, the same are placed just as shown in the figures. The first moveable bodies 1a are mounted on first wedges 4a for diagonal movement of the first moveable bodies 1a, as will be described below. To this end, the first moveable bodies 1a comprise an inclined surface 6 that is in contact with the respective first wedge 4a.

On the other hand, according to the embodiment shown, two second moveable bodies 1b are placed in a centered position as shown in the figures. These second moveable bodies 1b are mounted on an intermediate piece 5, which, in turn is mounted on a second wedge 4b. In the initial position (FIG. 4) the second moveable bodies 1b are substantially in contact with one another by means of a bevel 7, while in the final position (FIG. 5) they are separated.

The mounting of the device according to the present embodiment is done in the following way. Firstly, a lower edge piece 12 is mounted for calibration.

Then, springs 15 are mounted which return the moveable bodies 1a, 1b to their initial positions. Then, the moveable bodies 1a, 1b and the intermediate piece 5 are mounted in their positions.

Then, locks for the lower edge piece 12 and a swage block 17, which provides rigidity to the assembly, are mounted. Lastly, the assembly is placed on a frame 16 with the wedges 4a, 4b integrated.

The calibration process, which is done by means of the device according to the present embodiment, is the last operation in the manufacturing process of the crankshaft. It must be stated that before the calibration process, during which the weight of the crankshaft is calibrated and lightened, other stages are performed, which are not described in the present embodiment because they are evident for a person skilled in the art and do not form part of the present embodiment.

The process of calibrating and lightening the weight of the components is the following. Firstly, the upper edge piece lowers until making contact with the lower edge piece 12 (which until this moment was immobile) and closes the device, enclosing the component 14. At this point, both edge pieces move downward in an integral way as a single block.

This movement as a block is possible thanks to the fact that the lower edge piece 12 is placed on a group of cylinders (not shown in the figure), which have a spring function and allow this effect.

The lower edge piece 12 has the moveable bodies secured to the same by the springs, moveable bodies which penetrate the aforementioned crankshaft chamfers, forming the cavities.

The movement of these moveable bodies can be divided into two parts:
  Movement with respect to the tooling: the springs that secure the moveable bodies to the tooling and restrict their movement with respect to the same to the XY plane (considering that the assembly of the upper and lower edge pieces moves along the Z axis).
  Movement with respect to the absolute coordinate axis: during the movement of the assembly, each moveable body moves on a respective wedge 4a, 4b that is immobile. These wedges 4a, 4b make the moveable bodies 1a, 1b move diagonally. The vertical component of that movement is equal to the movement of the edge pieces, and the horizontal component of the movement is equal to the movement with respect to the tooling.

When the cavities have been formed, the cylinders make the assembly of the edge pieces return to the initial position thereof. The springs 15 that secure the moveable bodies 1a, 1b also return them to their initial position.

Despite the fact that reference has been made to a specific embodiment of the invention, it is evident for a person skilled in the art that numerous variations and changes may be made to the device described, and that all the aforementioned details may be substituted by other technically equivalent ones, without detracting from the scope of protection defined by the attached claims. Thus, it will be appreciated that changes and modifications in the specifically-described embodiments may be carried out without departing from the principles of the present invention, which is intended to be limited only by the scope of the appended claims as interpreted according to the principles of patent law including the doctrine of equivalents.

The invention claimed is:

1. A device for calibrating and lightening the weight of a crankshaft, said device comprising:
  a tooling provided with a seat wherein the crankshaft is formed;
  a plurality of moveable bodies that are moveable between an initial position and a final position, wherein in the final position one end of each moveable body extends inwardly from said seat of said tooling to form a cavity to lighten the weight of the crankshaft;
  a plurality of wedges having inclined planes, wherein said movable bodies are mounted at said wedges and are movable diagonally with respect to said seat of said tooling; and
  an intermediate piece mounted on one of said wedges and having a pair of angled body support surfaces;
  wherein at least two of said moveable bodies are mounted along said intermediate piece at respective ones of said angled body support surfaces and have respective longitudinal axes arranged parallel to said angled body support surfaces, wherein said at least two of said moveable bodies are configured to move transversely in relation to their respective longitudinal axes; and
  wherein said tooling comprises a lower edge piece in which said moveable bodies are mounted, wherein said lower edge piece is moveable with respect to a frame of said device.

2. The device according to claim 1, wherein at least one or all of said moveable bodies comprise a lowered portion close to said end that forms said cavity to lighten the weight of the crankshaft, said lowered portion defining a projecting portion at said end, said projecting portion being that which forms said cavity.

3. The device according to claim 2, wherein said projecting portion has rounded edges.

4. The device according to claim 2, wherein said lowered portion has rounded edges.

5. The device according to claim 2, wherein said projecting portion has a substantially semicircular form in a plan view.

6. The device according to claim 2, wherein said projecting portion has a substantially rectangular form with its smaller sides curved in a plan view.

7. The device according to claim 2, wherein said moveable bodies mounted on said intermediate piece comprise bevels, said moveable bodies being substantially in contact with each other by means of said bevels when at said initial position, and wherein said bevels are arranged on said ends provided with said projecting portions.

8. The device according to claim 1, wherein at least one of said moveable bodies comprises an inclined surface complementary to said inclined plane of one of said wedges.

9. The device according to claim 1, wherein said moveable bodies mounted on said intermediate piece comprise bevels, said moveable bodies being substantially in contact with each other by means of said bevels when at said initial position.

10. The device according to claim 1, wherein said wedges are fixedly mounted to said frame of said device, such that the movement of said lower edge piece causes the movement of said moveable bodies from said initial position to said final position thereof.

11. The device according to claim 1, wherein each moveable body is associated with a spring that presses said moveable body back to its initial position.

12. A device for calibrating and lightening the weight of a crankshaft, said device comprising:
   a tooling provided with a seat wherein the crankshaft is formed;
   a plurality of moveable bodies that are moveable between an initial position and a final position, wherein in the final position one end of each moveable body comprises a projecting portion and extends inwardly from said seat of said tooling to form a cavity to lighten the weight of the crankshaft;
   a plurality of wedges having inclined planes, wherein said movable bodies are mounted at said wedges and are movable diagonally with respect to said seat of said tooling; and
   an intermediate piece mounted on one of said wedges;
   wherein at least two of said moveable bodies are mounted along said intermediate piece and have respective bevels that contact one another in said initial position, and are movable apart to separate their bevels in response to movement of said intermediate piece toward said seat; and
   wherein said tooling comprises a lower edge piece in which said moveable bodies are mounted, wherein said lower edge piece is moveable with respect to a frame of said device.

13. The device according to claim 12, wherein all of said moveable bodies comprise one of said projecting portions and a lowered portion close to said end that forms said cavity to lighten the weight of the crankshaft, said lowered portion defining said projecting portion at said end, said projecting portion being that which forms said cavity.

14. The device according to claim 12, wherein said projecting portion has a substantially semicircular form in a plan view.

15. The device according to claim 12, wherein each of said projecting portions has a substantially rectangular form with its smaller sides curved in a plan view.

16. The device according to claim 12, wherein each of said projecting portions has rounded edges and each of said lowered portions has rounded edges.

17. The device according to claim 12, wherein at least one of said moveable bodies comprises an inclined surface complementary to said inclined plane of a respective one of said wedges.

18. The device according to claim 12, wherein said wedges are fixedly mounted to said frame of said device, such that the movement of said lower edge piece causes the movement of said moveable bodies from said initial position to said final position thereof.

* * * * *